(No Model.)
F. H. HEISE.
MACHINE FOR WINNING STONE OR COAL.
No. 601,467. Patented Mar. 29, 1898.
Fig. I.
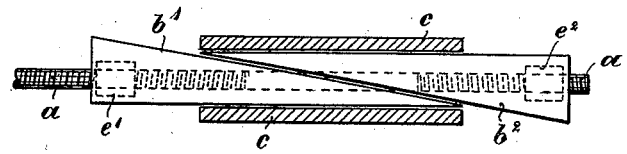
Fig. II.
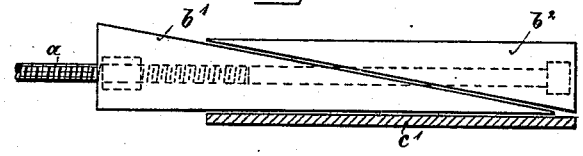
Fig. III.
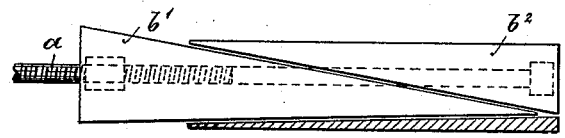
Fig. IV.
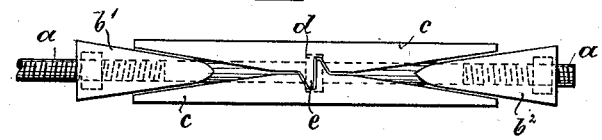
Witnesses.
N. P. Cook
M. M. Robinson
Inventor
Fritz Hermann Heise
By his Atty
Charles J. Kintner

UNITED STATES PATENT OFFICE.

FRITZ HERMANN HEISE, OF GELSENKIRCHEN, GERMANY.

MACHINE FOR WINNING STONE OR COAL.

SPECIFICATION forming part of Letters Patent No. 601,467, dated March 29, 1898.

Application filed July 27, 1897. Serial No. 646,098. (No model.)

*To all whom it may concern:*

Be it known that I, FRITZ HERMANN HEISE, a subject of the King of Prussia, German Emperor, residing at the city of Gelsenkirchen, in the Kingdom of Prussia, German Empire, have made a new and useful Invention in Mechanism for Winning Stone or Coal, of which the following is a specification.

My invention is directed to that type of winning mechanism in which two wedges are utilized and caused to be forced the one against the other by a screw uniting the same together, and will be fully understood by referring to the accompanying drawings, in which—

Figure 1 is a part sectional part side elevational view of one form thereof, Figs. 2 and 3 being similar views of additional modified forms, while Fig. 4 is a side elevational view of a still further modified form thereof.

Stone and coal winning mechanism of the type hereinbefore referred to as heretofore constructed is open to the objection that the wedges which effect the winning or breaking down of the stone or coal advance irregularly between the outer sustaining-guideways which direct the action thereof. This irregular advancement causes the wedges to stick fast, which necessarily prevents a uniform expansion of the outer pieces throughout their entire length, and therefore greatly retards the release of the mechanism, especially when the screw-spindle which controls the wedges is revolved in the opposite direction. That wedge which is held most strongly tends to remain fast or fixed in its place, while the other wedge alone retreats, and the screw-spindle at the same time is removed from the wedge which is held fast. My invention has for its object the obviation of these objectionable features and to effect a uniform pressure over the whole length of the outer guideways or pieces and an easy and certain release of the wedges when the screw-spindle is reversed in its direction of rotation. This object is obtained by making the resistance to be overcome between the wedges uniform or by so arranging the parts that the screw or spindle cannot alter its position with regard to the outer pieces or guideways.

Referring now to the drawings in detail and first to Fig. 1, $c\ c$ represent guideways or pieces adapted to guide or direct the movement of two similar wedges $b'\ b^2$, having their wedge-shaped faces adjacent. $a$ is a screw spindle or rod having right and left hand screw-threads at its opposite ends, and $e'\ e^2$ are nuts so secured that they cannot revolve, but adapted, when the screw spindle or rod $a$ is revolved, to cause the wedges $b'\ b$ to approach toward or recede from each other between the movable guiding-pieces $c\ c$, according to the direction of rotation of said spindle or rod $a$. As the two wedges $b'$ and $b$ advance toward each other they cause the guiding-pieces $c\ c$ to expand uniformly and produce the desired effect in breaking down or winning the stone or coal in a manner well understood. The motion of the wedges, therefore, is such as to cause a uniform pressure upon the whole length of the two outer guiding-pieces $c\ c$, so that both during the drawing together of said wedges and the separation thereof it is not possible that they will stick together in the manner heretofore referred to.

In the modified form shown in Fig. 2 the screw rod or spindle $a$ is screw-threaded at one end only, the other end being directly attached to the upper wedge $b^2$ by means of a revolving or swivel head. In this modified form only one outer guiding-piece is required, for the reason that the wedge $b^2$ remains stationary. Instead of having the two outer surfaces of the wedges parallel with each other, as illustrated in Fig. 2, the moving wedge $b'$ might be of the form shown in Fig. 3, the outer or guiding piece $c$ being wedge-shaped on one face. This would give a uniform pressure of the whole length of the wedge in the same manner as disclosed in connection with the modified form shown in Fig. 2.

In Fig. 4 I have shown a still further modified form in which the two guiding-pieces $c\ c$ have parallel outer faces and wedge-shaped inner faces, said guiding-pieces being provided near their centers with notches $e$, located in alinement with each other, and the screw or spindle $a$ being provided with a collar adapted to move within said notches, the two wedges $b'$ and $b^2$ being connected, as before, to the screw-nuts, so that when the screw-spindle is advanced said wedges will be advanced between the guiding-pieces $c\ c$ and force them to move laterally. Should one operation of the device fail to break down the stone or coal, the screw-spindles are rotated in reverse direction until the guiding-pieces $c\ c$ are liberated and additional guiding-pieces placed in position, after which the operation may be repeated until the desired result is effected.

I am aware of British Patents No. 1,306 of 1888, granted to Tennant and Sharp; No. 5,061 of 1883, granted to Hall and Low; No. 805 of 1884, granted to Lishnau; No. 7,159 of 1886, granted to Jackson; German Patent No. 28,448 to Hall and Low, and French Patent No. 93,364, and I make no claim hereinafter broad enough to include anything disclosed in any of the aforesaid patents.

Having thus described my invention, what I claim, and desire to secure by Letters Patent of the United States, is—

1. Stone breaking or winning mechanism consisting of two wedges having parallel outer faces and inclined or wedge-shaped adjacent faces, in combination with a screw-spindle having right and left handed screw-threads at its opposite ends, together with nuts for said screw-threads so secured that they cannot revolve, and movable expansible guiding-pieces, all of said parts acting substantially as described.

2. Stone breaking or winning mechanism having two similar wedges $b'\ b^2$ with their wedge-shaped faces located adjacent to each other, a screw spindle or rod $a$ having right and left handed screw-threads at its opposite ends, nuts $e'\ e^2$ fixedly secured from revolving, guiding-pieces $c\ c$ located adjacent to the parallel outer faces of said wedges, all of said parts being arranged so that the wedges are caused to advance toward or recede from each other between the guiding-pieces, substantially as described.

In testimony whereof I have hereunto subscribed my name this 30th day of June, 1897.

FRITZ HERMANN HEISE.

Witnesses:
 W. HAUPT,
 HENRY HARPER.